C. G. VAN PAPPELENDAM.
VENTILATING CARS.

No. 179,630. Patented July 4, 1876.

WITNESSES:
Cx Neveux
John Goethals

INVENTOR:
C. G. Van Pappelendam
BY
ATTORNEYS.

UNITED STATES PATENT OFFICE.

CORNELIUS G. VAN PAPPELENDAM, OF CHARLESTON, IOWA.

IMPROVEMENT IN VENTILATING CARS.

Specification forming part of Letters Patent No. 179,630, dated July 4, 1876; application filed April 18, 1876.

*To all whom it may concern:*

Be it known that I, CORNELIUS GYSBERTUS VAN PAPPELENDAM, of Charleston, county of Lee, and State of Iowa, have invented a new Improvement in Ventilating Cars, of which the following is a specification:

My invention consists of a contrivance of a system of pipes in the upper portion of the car to take out the vitiated air by the draft caused by the motion of the car, and also of pipes with a hood on the top, for catching the air and conducting it down along a heater, in cold weather, to a conductor along the floor and below it, the floor being perforated to allow the air to rise into the car.

Figure 1:
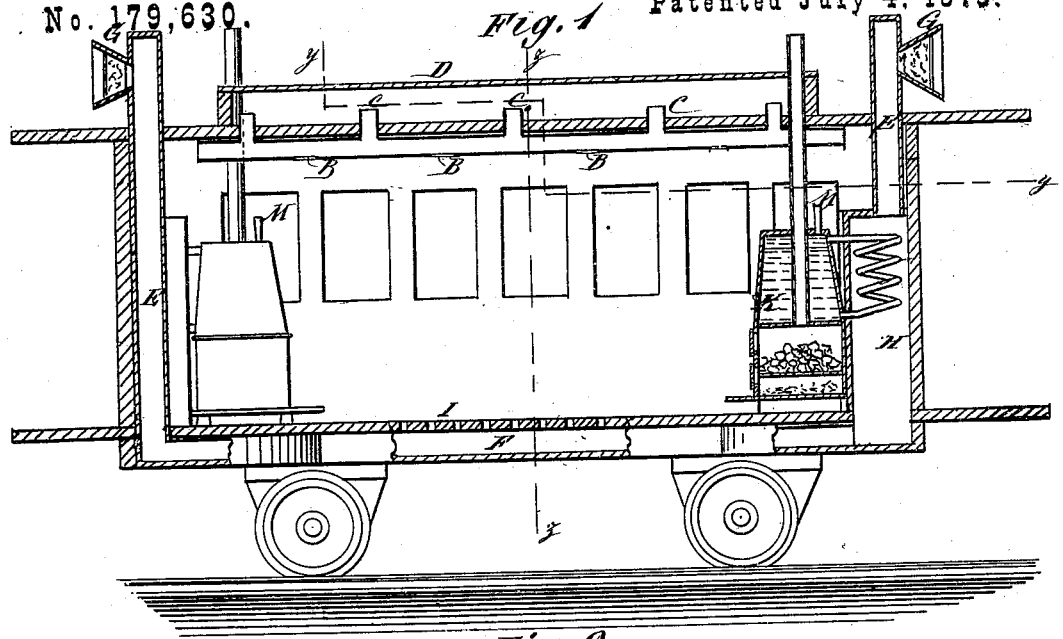
Figure 2:
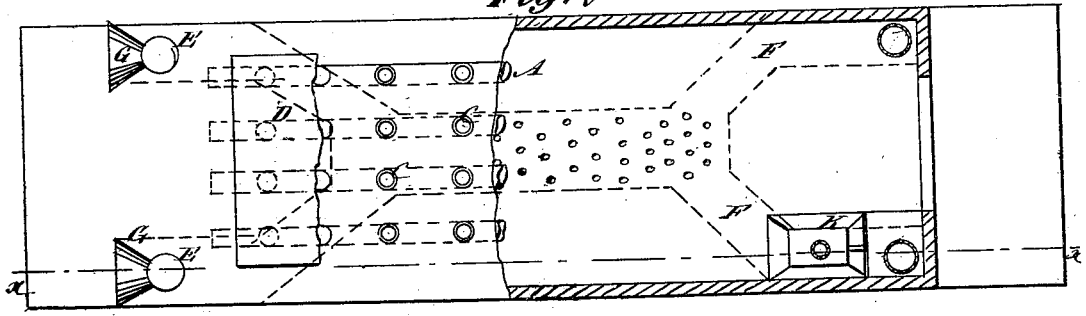
Figure 3:
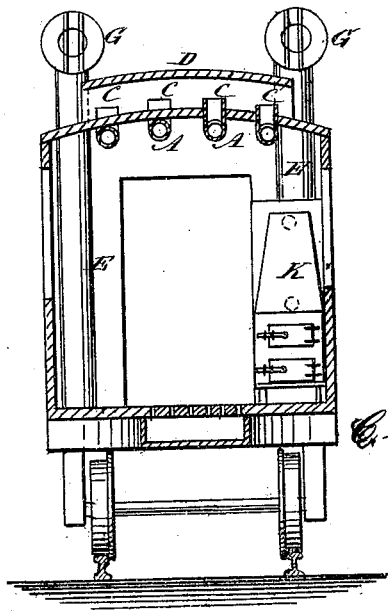

Figure 1 is a longitudinal sectional elevation of a car with my improved ventilating apparatus, the section being taken on line X X of Fig. 2. Fig. 2 is partly a plan view and partly a longitudinal section on line Y Y of Fig. 1, and Fig. 3 is a transverse section on line Z Z of Fig. 1.

A represents the pipes under the top of the car for taking out the vitiated air. They are open at the ends, and have openings B along the under side, at suitable intervals apart, and from the upper side they have short vertical exhaust-pipes C, passing through the top of the car, and discharging under an upper top, D, to prevent the rain, dust, &c., from falling down the pipes, said top being open along the sides. E represents a large vertical pipe at each corner of the car, extending from above the top to an air-duct, F, below the floor, and having a hood, G, to catch the air, in which hood is a filter of cotton or other suitable material, to stop the dust and smoke. On one side of the car these pipes conduct the air through a heating-chamber, H, to warm the air in winter. From the duct F the air rises up through perforations I into the car. Dampers will be arranged to shut off the air and regulate the amount as required. The chamber H is heated by a coil, J, from a water-heater, K, on a stove, L, the pipe of which passes through the heater K. M is a funnel-shaped filling-tube to the water-heater, and it affords escape for the steam, which will moisten the dry air in the car.

The apparatus is applicable to street-cars and omnibuses.

Having thus described my invention, what I claim as new, and desire to secure by Letters Patent, is—

The combination of pipes A, open at the ends and under side, the pipes C, passing through side-open top, the corner pipes E, and the air-chamber F, all arranged in connection with the perforated floor of a car, substantially as and for the purpose specified.

CORNELIUS G. VAN PAPPELENDAM.

Witnesses:
ARCHIE VERMAZEN,
JAMES VERMAZEN.